US008349930B2

(12) United States Patent
Nielsen et al.

(10) Patent No.: US 8,349,930 B2
(45) Date of Patent: Jan. 8, 2013

(54) GLYCEROL ESTERS

(75) Inventors: Bjarne Nielsen, Hovedgard (DK); Flemming Vang Sparsø, Skanderborg (DK)

(73) Assignee: Danisco A/S, Copenhagen K (DK)

( * ) Notice: Subject to any disclaimer, the term of this patent is extended or adjusted under 35 U.S.C. 154(b) by 458 days.

(21) Appl. No.: 12/522,124

(22) PCT Filed: Dec. 11, 2007

(86) PCT No.: PCT/IB2007/004377
§ 371 (c)(1),
(2), (4) Date: Nov. 5, 2009

(87) PCT Pub. No.: WO2008/081330
PCT Pub. Date: Jul. 10, 2008

(65) Prior Publication Data
US 2010/0076135 A1 Mar. 25, 2010

(30) Foreign Application Priority Data
Jan. 3, 2007 (GB) .................................. 0700076.3

(51) Int. Cl.
*C08K 5/09* (2006.01)

(52) U.S. Cl. ........ 524/287; 524/312; 524/313; 524/306; 524/311; 524/504; 524/567; 524/563; 560/190; 554/227

(58) Field of Classification Search .................. 524/287, 524/312, 313, 306, 311, 504, 567, 563; 560/190; 554/227
See application file for complete search history.

(56) References Cited

U.S. PATENT DOCUMENTS

| | | | |
|---|---|---|---|
| 4,083,816 | A | 4/1978 | Frankel et al. |
| 4,426,477 | A | 1/1984 | Yasumatsu et al. |

FOREIGN PATENT DOCUMENTS

| | | | | |
|---|---|---|---|---|
| EP | 1 029 890 | A2 | | 8/2000 |
| EP | 1 624 014 | A1 | * | 2/2006 |
| WO | WO 01/14466 | A1 | * | 3/2001 |
| WO | WO 01/60172 | A1 | | 8/2001 |
| WO | WO 02/098987 | | | 12/2002 |
| WO | WO 02/098987 | A2 | * | 12/2002 |

OTHER PUBLICATIONS

Teupel, M., et al., "Analyse von Ricinolsäeuremonoglyceriden mittels Säulenchromatographie and Kernresonanzspektroskopie," (1968)Tenside, Surfactants, Detergents pp. 275-278.

Australian Government Department of the Environment and Heritage, "Biodegradable Plastics—Developments and Environmental Impacts," Oct. 2002. http://www.environment.gov.au/settlements/publications/waste/degradables/biodegradable/chapter3.html [retrieved on Aug. 14, 2008].

Teupel, et al. "Ricinolsaeuremonoglyceriden Mittels Saeulenchromatographie and Kernresonanzspektroshopie," *Tenside, Surfactants, Detergents* (1968), Carl Hanser Verlag, pp. 275-278. English Translation.

* cited by examiner

*Primary Examiner* — Robert D. Harlan
(74) *Attorney, Agent, or Firm* — Steptoe & Johnson LLP

(57) ABSTRACT

There is provided a compound of the formula (I) wherein R1 is an alkyl, alkenyl or alkynyl group containing x carbon atoms, wherein x is from 1 to 10, wherein one of R2 and R3 is an alkyl, alkenyl or alkynyl group containing y carbon atoms, wherein y is from 1 to 10, wherein the other of R2 and R3 is a branched group of the formula (II) wherein q is from 0 to 3, wherein each R5 is independently selected from —OH and —O—C(O)—R4, wherein n is from 10 to 20 and m is selected from 2n-q, 2n-2-q, 2n-4-q, and 2n-6-q, wherein each R4 is independently selected from alkyl, alkenyl and alkynyl groups containing z carbon atoms, wherein z is from 7 to 21, wherein z is different to at least one of x and y.

(I)

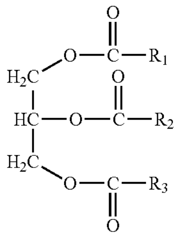

(II)

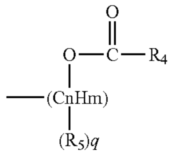

30 Claims, 3 Drawing Sheets

Figure 1:
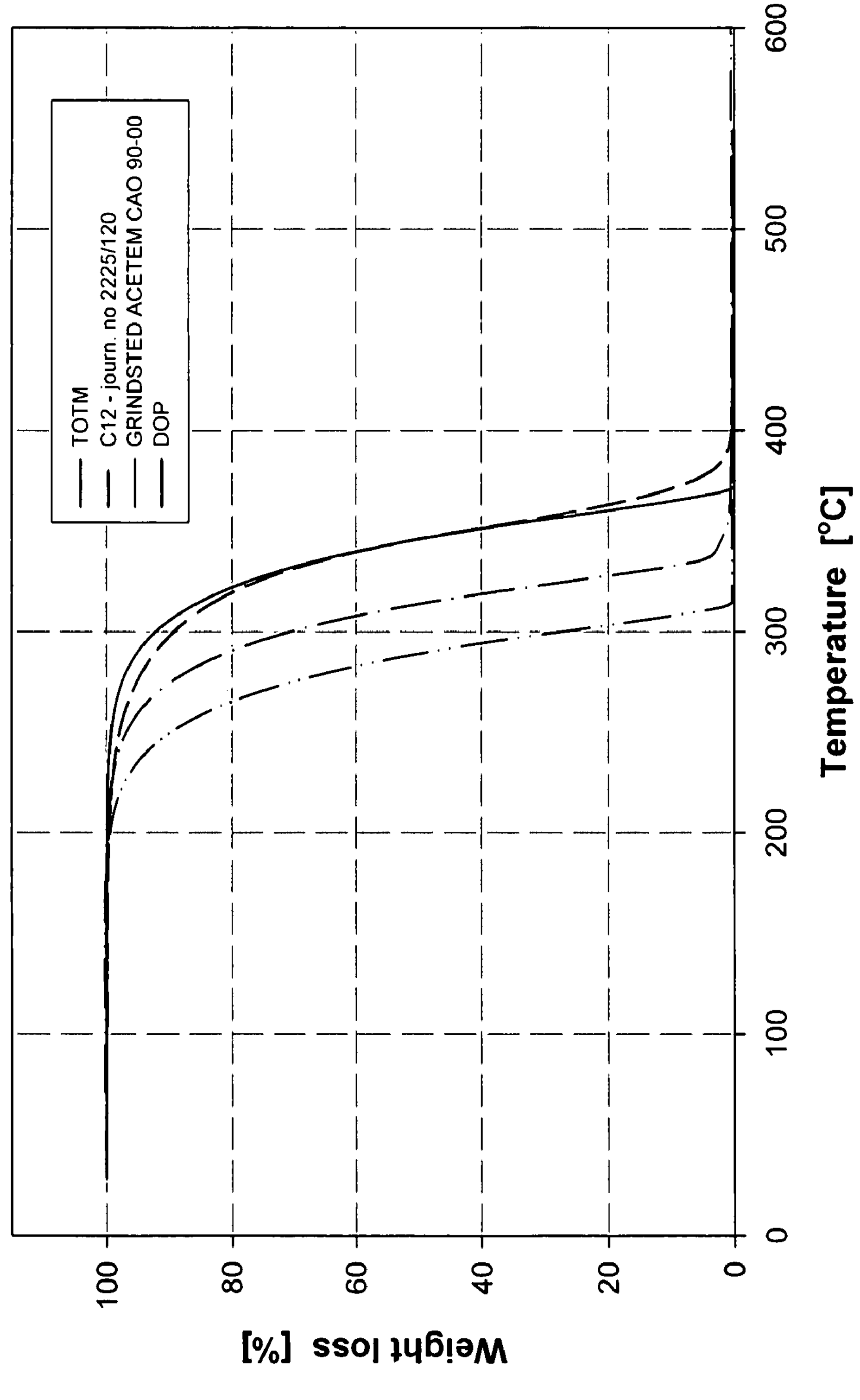

Figure 1 - TGA Profile of PVC Plasticisers
Nitrogen atmosphere, heating at 10 K/min.

Figure 2:
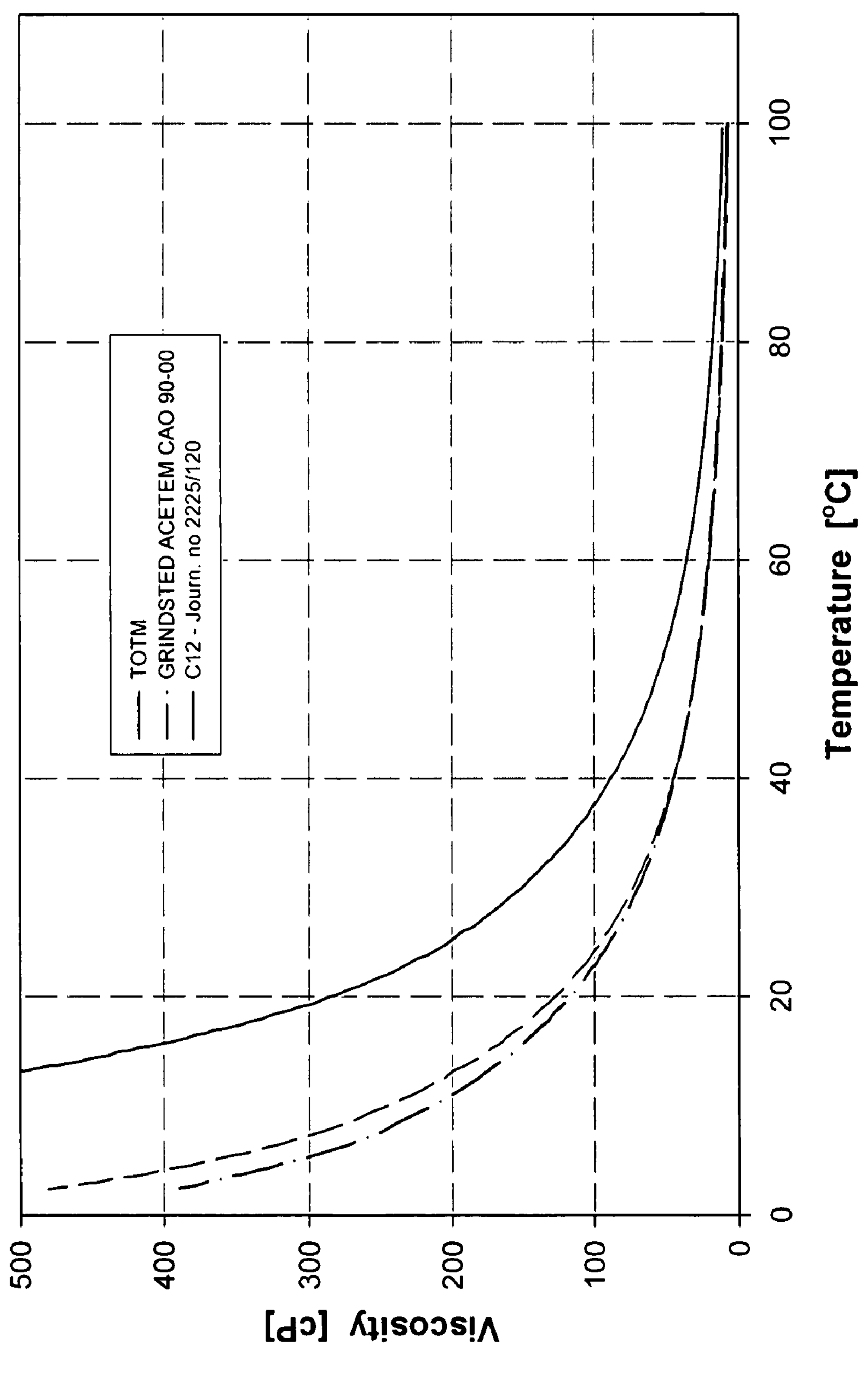

Figure 2 - Viscosity Profile of PVC Plasticisers

GLYCEROL ESTERS

CLAIM OF PRIORITY

This application claims priority under 35 USC 371 to International Application No. PCT/IB2007/004377, filed on Dec, 11, 2007, which claims priority to British Application Serial No. 0700076.3, filed on Jan. 3, 2007, each of which is incorporated by reference in its entirety.

The present invention relates to a compound. In particular, the present invention relates to a compound which may act as a plasticiser and to a composition comprising a thermoplastic polymer and the compound.

The manufacturing properties of thermoplastic polymers, for example the extruding properties of such polymers, is often modified/enhanced by the addition of plasticisers thereto. As acknowledged in the prior art, such as in U.S. Pat. No. 4,426,477, there is a tendency toward avoiding the commonly used plasticisers such as dioctyl adipate (DOA) and phthalate plasticisers such as dioctyl phthalate (DOP). The safety of these plasticisers has been called into question, particularly in certain applications.

U.S. Pat. No. 4,426,477 discloses plasticisers based on glycerol esters. The plasticisers consist of compounds prepared by the acylation of glycerol. The compounds comprises triesters, wherein approximately two of the acyls have two carbons and the remaining one acyl has from 10 to 14 carbons. The compounds of U.S. Pat. No. 4,426,477 provide a plasticising effect. However, in certain applications the plasticisers have a volatility such that they may migrate out of the thermoplastic polymer in which they are incorporated, such as PVC.

Our earlier application published as WO 01/14466 teaches a thermoplastic polymer composition containing a compound having the formula

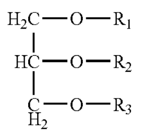

wherein $R_1$, $R_2$ and $R_3$ are independently selected from an acyl group or a hydrogen atom, wherein at least one of $R_1$, $R_2$ and $R_3$ is an acyl group (a short acyl group) having from 2 to 6 carbon atoms, and wherein at least one of $R_1$, $R_2$ and $R_3$ is a branched chain acyl group (a long acyl group) consisting of a saturated chain having 10 to 20 carbon atoms and a hydrophilic branch group.

The present invention alleviates problems of the prior art.

Aspects of the invention are defined in the appended claims.

In one aspect the present invention provides a compound of the formula

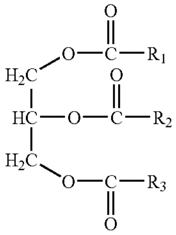

wherein $R_1$ is an alkyl, alkenyl or alkynyl group containing x carbon atoms, wherein x is from 1 to 10, wherein one of $R_2$ and $R_3$ is an alkyl, alkenyl or alkynyl group containing y carbon atoms, wherein y is from 1 to 10, wherein the other of $R_2$ and $R_3$ is a branched group of the formula

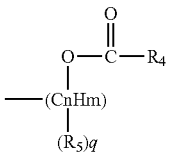

wherein q is from 0 to 3, wherein each $R_5$ is independently selected from —OH and —O—C(O)—$R_4$, wherein n is from 10 to 20 and m is selected from 2n-q, 2n-2-q, 2n-4-q, and 2n-6-q, wherein each $R_4$ is independently selected from alkyl, alkenyl and alkynyl groups containing z carbon atoms, wherein z is from 7 to 21, wherein z is different to at least one of x and y.

In one aspect the present invention provides a composition comprising i) a thermoplastic polymer, and ii) a compound as defined herein.

Some Advantages

The compounds of the present invention exhibit plasticising properties when incorporated in thermoplastic polymers. In addition and advantageously, the present compounds have lower volatility compared to prior plasticising compounds or prior compounds having a similar plasticising effect and are consequently less prone to migration within and/or from a thermoplastic polymer.

The present invention provides compounds meeting the above requirements of effective plasticising activity and acceptable volatility. In particular in some aspects the present invention provides an acylated monoglyceride of an acylated hydroxy fatty acid. The acyl groups on the glycerol backbone are short chain fatty acids typically ranging from C2 to C6 e.g. acetic acid, propionic acid and butyric acid. The acyl group on the hydroxy fatty acid is a medium or long chain fatty acid saturated or unsaturated typically ranging from C8 to C24, including octanoic acid, decanoic acid, dodecanoic acid, myristic acid, palmitic acid, stearic acid, oleic acid, arichidic acid and behenic acid. The hydroxy fatty acid may have one or more hydroxyl groups, preferable one hydroxyl group and may have between 10 to 24 carbon atoms, preferably 16-18 carbon atoms more preferably 18 carbon atoms. The hydroxy fatty acid may be saturated or unsaturated, but in a preferable aspect is saturated. We have found that a particularly effective hydroxy fatty acid is 12-hydroxy stearic acid. An example of a compound of the present invention and one that has been found to be effective as a non-volatile plasticiser is 12-Dodecanoyloxy-octadecanoic acid 2,3-bis-acetoxy-propyl ester.

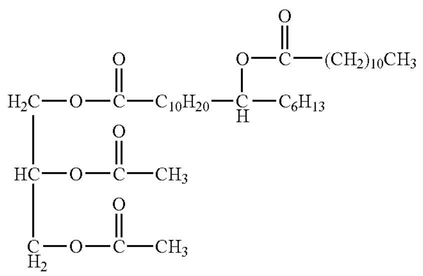

12-Dodecanoyloxy-octadecanoic acid 2,3-bis-acetoxy-propyl ester ($C_{37}H_{68}O_8$)— Mol. Wt.: 640.93

Preferred Aspects $R_1$ may be a straight chain or branched alkyl, alkenyl or alkynyl group. In one preferred aspect of the present invention $R_1$ is a straight chain alkyl, alkenyl or alkynyl group One of $R_2$ and $R_3$ may be a straight chain or branched alkyl, alkenyl or alkynyl group containing y carbon atoms, wherein y is from 1 to 10. In one preferred aspect of the present invention one of $R_2$ and $R_3$ is a straight chain alkyl, alkenyl or alkynyl group containing y carbon atoms, wherein y is from 1 to 10.

In one preferred aspect of the present invention, z is different to x and y.

In one preferred aspect of the present invention x is equal to y.

Preferably x is equal to y, and z is different to x and y. Otherwise expressed $x=y\neq z$ In one preferred aspect of the present invention x is from 1 to 8, more preferably x is from 1 to 5, more preferably x is from 1 to 3. In a preferred aspect x is 1 or 2. In a highly preferred aspect x is 1.

In one preferred aspect of the present invention y is from 1 to 8, more preferably y is from 1 to 5, more preferably y is from 1 to 3. In a preferred aspect y is 1 or 2. In a highly preferred aspect y is 1.

The branched group is of the formula

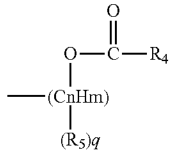

q is from 0 to 3. Each $R_5$ is independently selected from —OH and —O—C(O)—$R_4$, wherein n is from 10 to 20 and m is selected from 2n-q, 2n-2-q, 2n-4-q, and 2n-6-q. Each $R_4$ is independently selected from alkyl, alkenyl and alkynyl groups containing z carbon atoms, wherein z is from 7 to 21.

In one preferred aspect of the present invention z is from 8 to 17. Preferably z is from 8 to 15, more preferably z is from 9 to 13. In a highly preferred aspect z is 11.

In one preferred aspect of the present invention n is from 16 to 20, more preferably 16 to 18. In a preferred aspect n is 17.

m is selected from 2n-q (saturated), 2n-2-q (one degree of unsaturation), 2n-4-q (two degrees of unsaturation), and 2n-6-q (three degrees of unsaturation). In one preferred aspect of the present invention m is 2n-q.

In one preferred aspect of the present invention q is 0.

In a preferred aspect q is 0. Hence m is selected from 2n, 2n-2, 2n-4 and 2n-6. In this aspect the branched group is of the formula

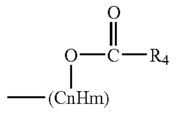

wherein m is selected from 2n, 2n-2, 2n-4 and 2n-6.

In a highly preferred aspect q is 0 and m is selected from 2n-q. Hence m is 2n. In this aspect the branched group is of the formula

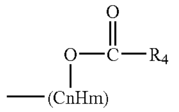

wherein m=2n.

In one preferred aspect of the present invention the branched group is a group of the formula

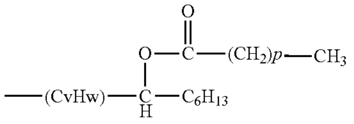

wherein v is from 7 to 10, w is 2v, and p is from 7 to 19. Preferably v is 10.

In one preferred aspect of the present invention p is from 7 to 14. Preferably p is 8 or 12. In a highly preferred aspect p is 10.

Either $R_2$ or $R_3$ may form the branched group of the present compounds. The $R_2$ group is at the 2 position of the parent glycerol. The $R_3$ group is at the 1 position of the parent glycerol. Thus the compound of the present invention may be of the following isomers

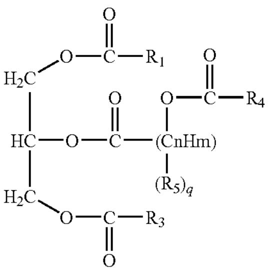

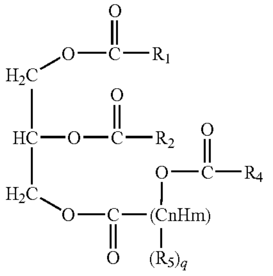

In one preferred aspect of the present invention $R_3$ is the branched group. The branched group is preferably on the 1 position of the parent glycerol In one highly preferred aspect x is 1, y is 1, n is 17, m is 34, q is 0 and z is 11.

In one highly preferred aspect the compound of the present invention is of the formula

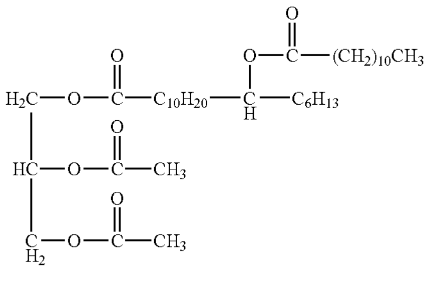

As disclosed above, in one aspect the compound of the invention may be combined with a thermoplastic polymer to provide a polymer composition. The thermoplastic polymer preferably is or comprises a vinyl chloride polymer or a vinyl chloride copolymer selected from vinyl chloride/vinyl acetate copolymer, vinyl chloride/vinylidene chloride copolymer, vinyl chloride/ethylene copolymer and a copolymer prepared by grafting vinyl chloride onto ethylene/vinyl acetate copolymer, and mixtures thereof.

In one aspect the present invention provides a composition comprising a compound as defined above and an aliphatic polyester. Preferably the aliphatic polyester is biodegradable. By biodegradable it is meant that a material may be decomposed by indigenous or exogenous organisms, or their enzymes, often in combination with natural weathering and oxidation or reduction processes.

In one aspect the composition may comprise any biodegradable polymer in partial or complete replacement of the thermoplastic polymer. Thus in one aspect the present invention provides:

a composition comprising i) a biodegradable polymer ii) a compound of the formula

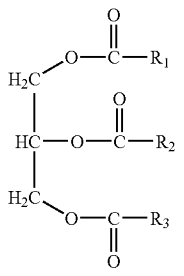

wherein $R_1$ is an alkyl, alkenyl or alkynyl group containing x carbon atoms, wherein x is from 1 to 10, wherein one of $R_2$ and $R_3$ is an alkyl, alkenyl or alkynyl group containing y carbon atoms, wherein y is from 1 to 10, wherein the other of $R_2$ and $R_3$ is a branched group of the formula

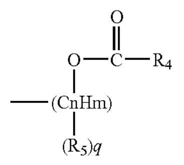

wherein q is from 0 to 3, wherein each $R_5$ is independently selected from —OH and —O—C(O)—$R_4$, wherein n is from 10 to 20 and m is selected from 2n-q, 2n-2-q, 2n-4-q, and 2n-6-q, wherein each $R_4$ is independently selected from alkyl, alkenyl and alkynyl groups containing z carbon atoms, wherein z is from 7 to 21, wherein z is different to at least one of x and y.

Details of suitable biodegradable polymers can be found in the publication "Biodegradable Plastics—Developments and Environmental Impacts", October 2002, by Australian Government Department of the Environment and Heritage (a copy of which can be found at http://www.deh.gov.au/settlements/publications/waste/degradables/biodegradable/chapter3.html)

Preferably the polymer is a plastic polymer. By plastic it is typically meant a material that is capable of flowing under heat and/or pressure and then subsequently setting.

As discussed in EP1029890 suitable aliphatic polyesters for use used in the present invention include an aliphatic polyester comprising a lactic acid unit in the molecule. Specific examples thereof include (1) polylactic acid, and lactic acid-other aliphatic hydroxycarboxylic acid copolymers, (2) aliphatic polyesters comprising polyfunctional polysaccharides and a lactic acid unit, (3) aliphatic polyesters comprising an aliphatic polyvalent carboxylic acid unit, an aliphatic polyvalent alcohol unit and a lactic acid unit, and (4) mixtures thereof. Namely, examples thereof include the lactic acid-based polymers (1) to (4). Among them, polylactic acid, and lactic acid-other aliphatic hydroxycarboxylic acid copolymers may be used. More preferable still is polylactic acid.

Lactic acid includes an L-lactic acid and a D-lactic acid. When referred to simply as lactic acid in the present invention, both the L-lactic acid and D-lactic acid are indicated unless otherwise stated. The molecular weight of a polymer indicates the weight-average molecular weight unless otherwise stated. As the polylactic acid used in the present invention, there are listed poly(L-lactic acid) solely composed of L-lactic acid, poly(D-lactic acid) solely composed of D-lactic acid, poly(DL-lactic acid) comprising a L-lactic acid unit and a D-lactic acid unit in various proportions, and the like. As the hydroxycarboxylic acid of a lactic acid-other aliphatic hydroxycarboxylic acid copolymer, there are listed glycolic acid, 3-hydroxybutyric acid, 4-hydroxybutyric acid, 4-hydroxyvaleric acid, 5-hydroxyvaleric acid, 6-hydroxycaproic acid and the like.

In one preferred aspect the thermoplastic polymer is or comprises a polymer blend of a thermoplastic polymer and a second polymer. Preferably the second polymer is a methacryl polymer or an acrylonitrile-butadiene-styrene polymer.

The compositions of the present invention may be formulated in any manner to provide the required plasticising properties of the compound. In a particular aspect the composition of the present invention comprises the compound in an amount of 1 to 100 parts by weight per 100 parts by weight of the thermoplastic polymer.

In a further aspect the composition may comprise any polymer in partial or complete replacement of the aliphatic polyester. Thus in one aspect the present invention provides:

a composition comprising i) a polymer ii) a compound of the formula

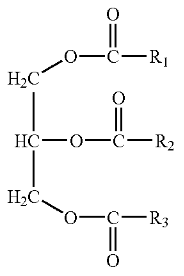

wherein $R_1$ is an alkyl, alkenyl or alkynyl group containing x carbon atoms, wherein x is from 1 to 10, wherein one of $R_2$ and $R_3$ is an alkyl, alkenyl or alkynyl group containing y carbon atoms, wherein y is from 1 to 10, wherein the other of $R_2$ and $R_3$ is a branched group of the formula

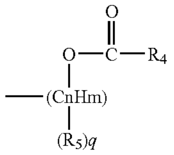

wherein q is from 0 to 3, wherein each $R_5$ is independently selected from —OH and —O—C(O)—$R_4$, wherein n is from 10 to 20 and m is selected from 2n-q, 2n-2-q, 2n-4-q, and 2n-6-q, wherein each $R_4$ is independently selected from alkyl, alkenyl and alkynyl groups containing z carbon atoms, wherein z is from 7 to 21, wherein z is different to at least one of x and y.

In a further aspect the present invention provides a composition comprising a mixture of compounds of the formula

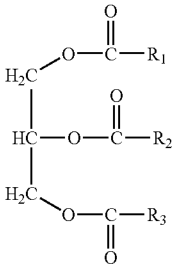

wherein the mixture comprises (i) a compound wherein one of $R_1$, $R_2$ and $R_3$ is an alkyl, alkenyl or alkynyl group containing x carbon atoms and each of the other two of $R_1$, $R_2$ and $R_3$ is a branched group of the formula

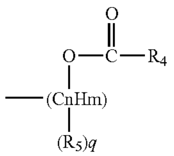

(ii) a compound wherein one of $R_1$ is an alkyl, alkenyl or alkynyl group containing x carbon atoms, wherein one of $R_2$ and $R_3$ is an alkyl, alkenyl or alkynyl group containing y carbon atoms, wherein the other of $R_2$ and $R_3$ is a branched group of the formula

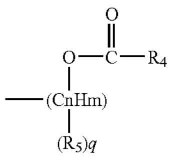

wherein x is from 1 to 10, wherein y is from 1 to 10, wherein q is from 0 to 3, wherein each $R_5$ is independently selected from —OH and —O—C(O)—$R_4$, wherein n is from 10 to 20 and m is selected from 2n-q, 2n-2-q, 2n-4-q, and 2n-6-q, wherein each $R_4$ is independently selected from alkyl, alkenyl and alkynyl groups containing z carbon atoms, wherein z is from 7 to 21, wherein z is different to at least one of x and y.

The groups containing x and y carbon atoms may be referred to as short groups.

In certain aspects, it is desirable for the short groups to be present in a maximum amount with respect to the total amount glycerol and esters thereof present in the composition. Preferably the short groups are present in an amount, on average, of no greater than 2 moles per mole of glycerol and esters thereof present in the composition.

In certain aspects, it is desirable for the branched group to be present in a minimum amount with respect to the total amount glycerol and esters thereof present in the composition. Preferably the branched group is present in an amount, on average, of at least 0.4 moles, preferably from 0.9 to 2 moles, more preferably from 0.9 to 1 moles per mole of glycerol and esters thereof present in the composition.

It may also be preferred for the majority of the glycerol present in the composition to be fully acylated. Accordingly, in a preferred aspect the total amount of short groups and branched groups is, on average, 2.7 to 3.0 moles per mole of glycerol and esters thereof.

The compound of the present invention may be prepared by interesterification between glycerol and one or more oils, including natural oils and hardened natural oils followed by acylation. Thus, the compound of the present invention may be the product of a two part process comprising (i) an interesterification between glycerol and an oil selected from castor oil, including hardened castor oil, unhardened castor oil and mixtures thereof, and (ii) acylation.

In the process of the present invention the chain having 10 to 20 carbon may be saturated or unsaturated.

The process of the present invention may utilise, for example, castor oil or hardened castor oil. The compound of the present invention may be prepared from hardened castor oil. A typical fatty acid profile of castor oil and hardened castor oil is given below.

| Castor Oil | | Hardened Castor Oil | |
|---|---|---|---|
| Fatty Acid | Content [%] | Fatty Acid | Content [%] |
| Palmitic (C16) | 1.0 | Palmitic (C16) | 1.3 |
| Stearic (C18) | 1.1 | Stearic (C18) | 9.3 |
| Oleic (C18:1) | 3.8 | Oleic (C18:1) | 0.9 |
| Linoleic (C18:2) | 4.4 | Linoleic (C18:2) | 0.2 |
| Linolenic (C18:3) | 0.5 | Arachidic (C20) | 0.7 |
| Gadoleic (C20:1) | 0.5 | Ricinoleic hard (C18-OH) | 84.9 |
| Ricinoleic (C18:1-OH) | 87.4 | | |

The nomenclature in parenthesis is Cxx:y where xx is the fatty acid carbon number and y indicates number of double bonds. Ricinoleic acid, hard (also known as 12-hydroxy stearic acid) has a hydroxyl group (OH) on the $12^{th}$ carbon.

In this aspect the product based on the castor oil, or indeed a product based on another oil, may be synthesised as follows. These synthetic routes are given by way of example only. Other routes would be appreciated by a person skilled in the art.

An improved purity may be obtained by protecting of the hydroxyl group of the hydroxy fatty acid of for example fully hydrogenated castor oil with dihydropyran followed by an interesterification with a triglyceride of the desired short chain fatty acid subsequently removal of the excess short chain triglyceride and distillation of the mono long chain fatty acid triglycerides. The protection group is then removed and the hydroxy fatty acid is esterified with a long chain fatty acid anhydride to form the desired product in a purity of up to 85% depending on the concentration of the hydroxy fatty acid in the fully hydrogenated castor oil. The purity can be further increased by removal of non-hydroxy fatty acid triglycerides, such as Mono-di-Ac-C18.

The present invention will now be described in further detail by way of example only with reference to the accompanying figures in which:—

Figure 3:
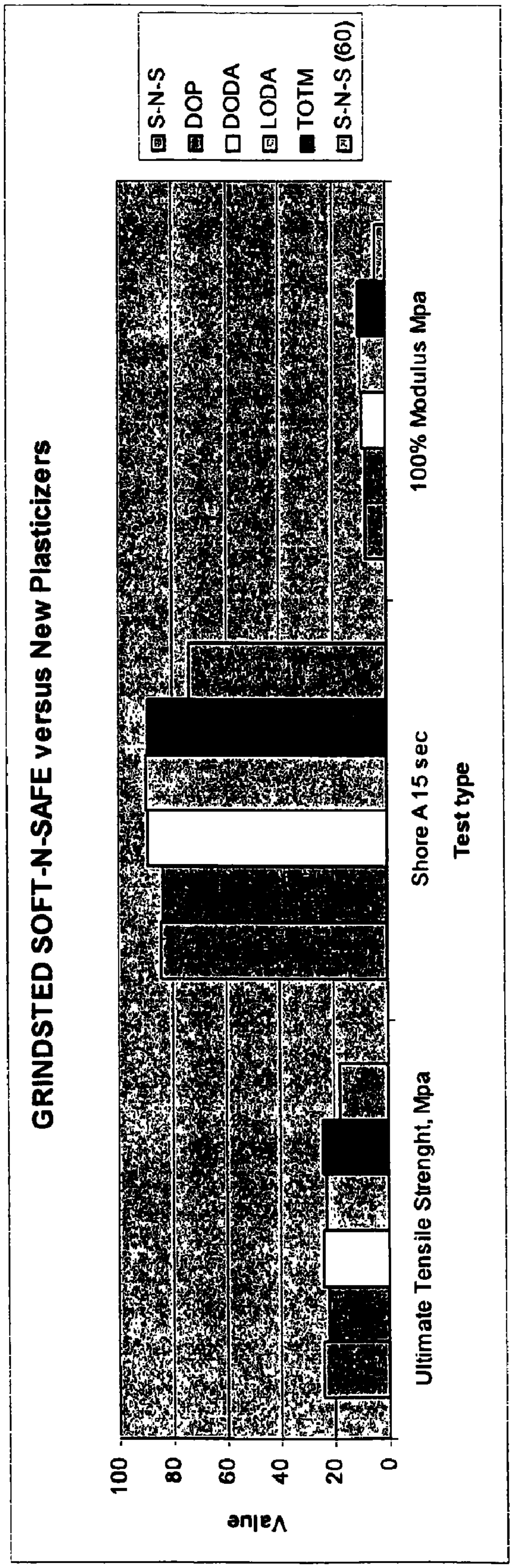

FIG. 1 shows a graph off TGA (thereto gravimetric analysis) profile measured in accordance with ASTM E1131 of PVC Plasticisers in Nitrogen atmosphere, heating at 10 K/min; and FIG. 2 shows a graph of Viscosity Profile of PVC Plasticisers FIG. 3 shows a graph of the data obtained in Example 2

The present invention will now be described in further detail in the following examples.

The invention will now be described in further detail in the following Examples.

EXAMPLES

Example 1

Plasticisers Evaluated

Four plasticisers were evaluated. These were:

1. GRINDSTED SOFT-N-SAFE, available from Danisco A/S and having the structure

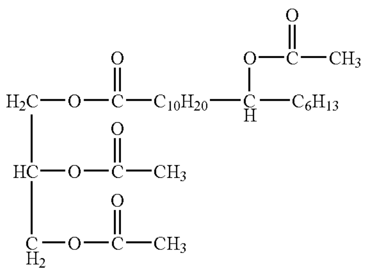

2. Tris (2-Ethylhexyl) Trimellitate (TOTM)—a conventional plasticiser available from Eastman Kodak
3. Polyadipate—Ultramol III, a conventional plasticiser available from Bayer
4. Present Compound (C12 Journal no. 2225/120)—a compound having the structure

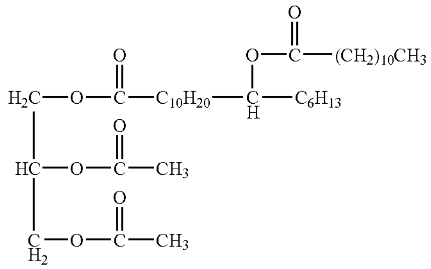

Synthesis

The compounds were prepared as follows. The product can be made in different purities ranging from 20 to 99% using different methods.

Process 1:

The first process is described in the following example:

Example 1

Preparation of 12-Octanoyloxy-octadecanoic acid 2,3-diacetoxy-propyl ester Mol. Wt.: 584.82

Step 1—Acylation of Fully Hardened Castor Oil with Octanoic Acid and Removal of the Produced Water and Excess Octanoic Acid.

1600 grams of fully hardened castor oil was placed in a reactor and acylated with 874 grams of octanoic acid at 225° C. for 6 hours at ambient pressure and continued 6 hours at 40-50 kPa. The produced water was removed during the reaction. The excess of octanoic acid was removed on a short path distillation column at 160° C. and a pressure of 0.1 Pa. Yield 1782 grams.

Step 2—Interesterification of Product from Step 1 with Triacetin 1735 grams of the product was interesterified with 1576 grams of triacetin in the presence of 4.4 grams of Sodium stearate and 13.0 grams of Aluminium stearate as catalyst. The reaction was carried out at 240° C. for 95 min at ambient pressure. Excess of triacetin was removed in 1 hour at 170° C. and 400 Pa. Yield 1970 grams.

Step 3—Recovering of Triglyceride with Two Short Chain Fatty Acids and One Long Chain Fatty Acid.

1840 grams of the product was distilled on a short path distillation column at 260° C. and 0.1 Pa to recover the 12-octanoyloxy-octadecanoic acid 2,3-diacetoxy-propyl ester. Yield 886 grams.

The product had the following content of the main components in weight percentage:

| Component | wt. % |
|---|---|
| 12-Octanoyloxy-octadecanoic acid 2,3-diacetoxy-propyl ester | 46.4 |

Step 4—Purification of the Product from Step 3 by Removal of Triglycerides Containing Non-Hydroxy Fatty Acid Purification of the main product by removal of on short path distillation column at 155° C. and 0.2 Pa. Feed 710 grams yield 554 grams. The product had the following content of the main component in weight percentage:

| Component | wt. % |
|---|---|
| 12-octanoyloxy-octadecanoic acid 2,3-diacetoxy-propyl ester | 56.8 |

Example 2

Preparation of 12-dodecanoyloxy-octadecanoic acid 2,3-diacetoxy-propyl ester Mol. Wt.: 640.93

Step 1—Acylation of Fully Hardened Castor Oil with Dodecanoic Acid and Removal of the Produced Water and Excess Dodecanoic Acid.

1450 grams of fully hardened castor oil was placed in a reactor and acylated with 1100 grams of dodecanoic acid at 225° C. in vacuum (5 kPa-15 kPa) for 8 hours. The excess of dodecanoic acid was removed on a short path distillation column at 170° C. and a pressure of 0.1 Pa. Yield 2242 grams.

Step 2—Interesterification of Product from Step 1 with Triacetin 1870 grams of the product was interesterified with 1524 grams of triacetin in the presence of 4.7 grams of Sodium stearate and 14.0 grams of Aluminium stearate as catalyst. The reaction was carried out at 240° C. for 105 min at ambient pressure. Excess of triacetin was removed in 1 hour at 170° C. and 400 Pa. Yield 2141 grams.

Step 3—Recovering of Triglyceride with Two Short Chain Fatty Acids and One Long Chain Fatty Acid.

1989 grams of the product was distilled on a short path distillation column at 260° C. and 0.1 Pa to recover the 12-Dodecanoyloxy-octadecanoic acid 2,3-diacetoxy-propyl ester. Yield 992 grams.

The product had the following content of the main components in weight percentage:

| Component | wt. % |
|---|---|
| 12-dodecanoyloxy-octadecanoic acid 2,3-diacetoxy-propyl ester | 31.3 |

Step 4—Purification of the Product from Step 3 by Removal of Triglycerides Containing Non-Hydroxy Fatty Acid Purification of the main product by removal of on short path distillation column at 150° C. and 0.14 Pa. Feed 822 grams yield 634 grams. The product had the following content of the main component in weight percentage:

| Component | wt. % |
|---|---|
| 12-Dodecanoyloxy-octadecanoic acid 2,3-diacetoxy-propyl ester | 61.7 |

Example 3

Preparation of 12-Dodecanoyloxy-octadecanoic acid 2,3-dibutoxy-propyl ester Mol. Wt.: 669.07

Step 1—Acylation of Fully Hardened Castor Oil with Dodecanoic Acid and Removal of the Produced Water and Excess Dodecanoic Acid.

1450 grams of fully hardened castor oil was placed in a reactor and acylated with 1100 grams of dodecanoic acid at 225° C. for 4 hours at ambient pressure and continued 6 hours at 4-5 kPa. The produced water was removed during the reaction. The excess of dodecanoic acid was removed on a short path distillation column at 170° C. and a pressure of 0.15 Pa. Yield 1947 grams.

Step 2—Interesterification of Product from Step 1 with Tributyrin 1870 grams of the product was interesterified with 2112 grams of tributyrin in the presence of 4.7 grams of Sodium stearate and 14.0 grams of Aluminium stearate as catalyst. The reaction was carried out at 240° C. for 115 min at ambient pressure. Excess of tributyrin was removed in 1 hour at 210° C. and 400 Pa. Yield 2155 grams.

Step 3—Recovering of Triglyceride with Two Short Chain Fatty Acids and One Long Chain Fatty Acid.

2153 grams of the product was distilled on a short path distillation column at 275° C. and 0.15 Pa to recover the 12-dodecanoyloxy-octadecanoic acid 2,3-dibutoxy-propyl ester. Yield 997 grams.

The product had the following content of the main components in weight percentage:

| Component | wt. % |
|---|---|
| 12-dodecanoyloxy-octadecanoic acid 2,3-dibutoxy-propyl ester | 31.0 |

Step 4—Purification of the Product from Step 3 by Removal of Triglycerides Containing Non-Hydroxy Fatty Acid Purification of the main product by removal of on short path distillation column at 160° C. and 0.1 Pa. Feed 819 grams yield 568 grams. The product had the following content of the main component in weight percentage:

| Component | wt. % |
|---|---|
| 12-dodecanoyloxy-octadecanoic acid 2,3-dibutoxy-propyl ester | 44.7 |

Example 4

Preparation of 12-Tetradecanoyloxy-octadecanoic acid 2,3-diacetoxy-propyl ester Mol. Wt.: 668.98

Step 1—Acylation of Fully Hardened Castor Oil with Tetradecanoic Acid and Removal of the Produced Water and Excess Tetradecanoic Acid.

1400 grams of fully hardened castor oil was placed in a reactor and acylated with 1200 grams of tetradecanoic acid at 225° C. for 2 hours at ambient pressure and continued 4 hours at 10 kPa. The produced water was removed during the reaction. The excess of tetradecanoic acid was removed on a short path distillation column at 175° C. and a pressure of 0.1 Pa. Yield 1860 grams.

Step 2—Interesterification of Product from Step 1 with Triacetin 1780 grams of the product was interesterified with 1385 grams of triacetin in the presence of 4.5 grams of Sodium stearate and 13.3 grams of Aluminium stearate as catalyst. The reaction was carried out at 250° C. for 90 min at ambient pressure. Excess of triacetin was removed in 1 hour at 170° C. and 400 Pa. Yield 2173 grams.

Step 3—Recovering of Triglyceride with Two Short Chain Fatty Acids and One Long Chain Fatty Acid.

2014 grams of the product was distilled on a short path distillation column at 280° C. and 0.25 Pa to recover the 12-tetradecanoyloxy-octadecanoic acid 2,3-diacetoxy-propyl ester. Yield 1104 grams.

The product had the following content of the main components in weight percentage:

| Component | wt. % |
|---|---|
| 12-Tetradecanoyloxy-octadecanoic acid 2,3-diacetoxy-propyl ester | 40.0 |

Step 4—Purification of the Product from Step 3 by Removal of Triglycerides Containing Non-Hydroxy Fatty Acid Purification of the main product by removal of on short path distillation column at 155° C. and 0.13 Pa. Feed 904 grams yield 690 grams. The product had the following content of the main component in weight percentage:

| Component | wt. % |
|---|---|
| 12-tetradecanoyloxy-octadecanoic acid 2,3-diacetoxy-propyl ester | 52.8 |

Example 5

Preparation of 12-hexadecanoyloxy-octadecanoic acid 2,3-diacetoxy-propyl ester Mol. Wt.: 697.04

Step 1—Acylation of Fully Hardened Castor Oil with Hexadecanoic Acid and Removal of the Produced Water and Excess Hexadecanoic Acid.

1400 grams of fully hardened castor oil was placed in a reactor and acylated with 1361 grams of hexadecanoic acid at 225° C. for 2 hours at ambient pressure and continued 4 hours at 10 kPa. The produced water was removed during the reaction. The excess of hexadecanoic acid was removed on a short path distillation column at 175° C. and a pressure of 0.1 Pa. Yield 1932 grams.

Step 2—Interesterification of Product from Step 1 with Triacetin 1900 grams of the product was interesterified with 1404 grams of triacetin in the presence of 4.8 grams of Sodium stearate and 14.2 grams of Aluminium stearate as catalyst. The reaction was carried out at 250° C. for 90 min at ambient pressure. Excess of triacetin was removed in 1 hour at 170° C. and 400 Pa. Yield 2365 grams.

Step 3—Recovering of Triglyceride with Two Short Chain Fatty Acids and One Long Chain Fatty Acid.

2080 grams of the product was distilled on a short path distillation column at 180° C. and 0.17 Pa to recover the 12-hexadecanoyloxy-octadecanoic acid 2,3-diacetoxy-propyl ester. Yield 1170 grams.

The product had the following content of the main components in weight percentage:

| Component | wt. % |
|---|---|
| 12-Hexadecanoyloxy-octadecanoic acid 2,3-diacetoxy-propyl ester | 41.1 |

Step 4—Purification of the Product from Step 3 by Removal of Triglycerides Containing Non-Hydroxy Fatty Acid Purification of the main product by removal of on short path distillation column at 165° C. and 0.1 Pa. Feed 958 grams yield 753 grams. The product had the following content of the main component in weight percentage:

| Component | wt. % |
|---|---|
| 12-hexadecanoyloxy-octadecanoic acid 2,3-diacetoxy-propyl ester | 52.4 |

Example 6

Preparation of 12-octadecanoyloxy-octadecanoic acid 2,3-diacetoxy-propyl ester Mol. Wt.: 725.09

Step 1—Acylation of Fully Hardened Castor Oil with Octadecanoic Acid and Removal of the Produced Water and Excess Octadecanoic Acid.

1600 grams of fully hardened castor oil was placed in a reactor and acylated with 1724 grams of octadecanoic acid at 240° C. for 4 hours at ambient pressure and continued 4 hours at 10 kPa. The produced water was removed during the reaction. The excess of octadecanoic acid was removed on a short path distillation column at 180° C. and a pressure of 0.15 Pa. Yield 2335 grams.

Step 2—Interesterification of Product from Step 1 with Triacetin 2200 grams of the product was interesterified with 1559 grams of triacetin in the presence of 5.5 grams of Sodium stearate and 16.5 grams of Aluminium stearate as catalyst. The reaction was carried out at 250° C. for 90 min at ambient pressure. Excess of triacetin was removed in 1 hour at 170° C. and 400 Pa. Yield 2590 grams.

Step 3—Recovering of Triglyceride with Two Short Chain Fatty Acids and One Long Chain Fatty Acid.

2462 grams of the product was distilled on a short path distillation column at 280° C. and 0.15 Pa to recover the 12-octadecanoyloxy-octadecanoic acid 2,3-diacetoxy-propyl ester. Yield 1274 grams.

The product had the following content of the main components in weight percentage:

| Component | wt. % |
|---|---|
| 12-Octadecanoyloxy-octadecanoic acid 2,3-diacetoxy-propyl ester | 26.3 |

Step 4—Purification of the Product from Step 3 by Removal of Triglycerides Containing Non-Hydroxy Fatty Acid Purification of the main product by removal of on short path distillation column at 170° C. and 0.2 Pa. Feed 1033 grams yield 830 grams. The product had the following content of the main component in weight percentage:

| Component | wt. % |
|---|---|
| 12-octadecanoyloxy-octadecanoic acid 2,3-diacetoxy-propyl ester | 35.2 |

Example 7

Preparation of 12-octadecenoyloxy-octadecanoic acid 2,3-diacetoxy-propyl ester Mol. Wt.: 723.07

Step 1—Acylation of Fully Hardened Castor Oil with Octadecenoic Acid and Removal of the Produced Water and Excess Octadecenoic Acid.

1600 grams of fully hardened castor oil was placed in a reactor and acylated with 1724 grams of octadecenoic acid at 240° C. for 4 hours at ambient pressure and continued 4 hours at 10 kPa. The produced water was removed during the reaction. The excess of octadecenoic acid was removed on a short path distillation column at 180° C. and a pressure of 0.2 Pa. Yield 2307 grams.

Step 2—Interesterification of Product from Step 1 with Triacetin 2200 grams of the product was interesterified with 1559 grams of triacetin in the presence of 5.5 grams of Sodium stearate and 16.5 grams of Aluminium stearate as catalyst. The reaction was carried out at 250° C. for 60 min at ambient pressure. Excess of triacetin was removed in 1 hour at 170° C. and 400 Pa. Yield 2575 grams.

Step 3—Recovering of Triglyceride with Two Short Chain Fatty Acids and One Long Chain Fatty Acid.

2424 grams of the product was distilled on a short path distillation column at 285° C. and 0.15 Pa to recover the 12-octadecenoyloxy-octadecanoic acid 2,3-diacetoxy-propyl ester. Yield 1272 grams.

The product had the following content of the main components in weight percentage:

| Component | wt. % |
|---|---|
| 12-Octadecenoyloxy-octadecanoic acid 2,3-diacetoxy-propyl ester | 24.5 |

Step 4—Purification of the Product from Step 3 by Removal of Triglycerides Containing Non-Hydroxy Fatty Acid Purification of the main product by removal of on short path distillation column at 170° C. and 0.13 Pa. Feed 961 grams yield 748 grams. The product had the following content of the main component in weight percentage:

| Component | wt. % |
|---|---|
| 12-octadecanoyloxy-octadecanoic acid 2,3-diacetoxy-propyl ester | 33.7 |

Example 8

Preparation of a Plasticiser

Step 1—Acylation of Fully Hardened Castor Oil with a Fatty Acid Mixture of 55% by Weight of Octanoic Acid and 45% by Weight of Decanoic Acid and Removal of the Produced Water and Excess Fatty Acids.

1700 grams of fully hardened castor oil was placed in a reactor and acylated with 993 grams of the fatty acid mixture at 240° C. for 4 hours at ambient pressure and continued 4 hours at 10 kPa. The produced water was removed during the reaction. The excess of octadecenoic acid was removed on a short path distillation column at 180° C. and a pressure of 0.15 Pa. Yield 2004 grams.

Step 2—Interesterification of Product from Step 1 with Triacetin 1900 grams of the product was interesterified with 1690 grams of triacetin in the presence of 4.8 grams of Sodium stearate and 14.2 grams of Aluminium stearate as catalyst. The reaction was carried out at 240° C. for 90 min at ambient pressure. Excess of triacetin was removed in 1 hour at 170° C. and 400 Pa. Yield 2240 grams.

Step 3—Recovering of Triglyceride with Two Short Chain Fatty Acids and One Long Chain Fatty Acid.

1975 grams of the product was distilled on a short path distillation column at 270° C. and 0.15 Pa to recover the plasticiser. Yield 1102 grams.

The product had the following content of the main components in weight percentage:

| Component | wt. % |
|---|---|
| 12-Octanoyloxy-octadecanoic acid 2,3-diacetoxy-propyl ester and 12-Decanoyloxy-octadecanoic acid 2,3-diacetoxy-propyl ester | 31.7 |

Step 4—Purification of the Product from Step 3 by Removal of Triglycerides Containing Non-Hydroxy Fatty Acid Purification of the main product by removal of on short path distillation column at 170° C. and 0.13 Pa. Feed 890 grams yield 722 grams. The product had the following content of the main component in weight percentage:

| Component | wt. % |
|---|---|
| 12-Octanoyloxy-octadecanoic acid 2,3-diacetoxy-propyl ester and 12-Decanoyloxy-octadecanoic acid 2,3-diacetoxy-propyl ester | 38.3 |

The table show the results from the 8 experiments.

| Experiment | Acyl group on 12-hydroxy stearic acid | Acyl group on glycerol backbone | Main component weight % |
|---|---|---|---|
| 1 | Octanoic, C8 | Acetic, C2 | 56.8 |
| 2 | Dodecanoic, C12 | Acetic, C2 | 61.7 |
| 3 | Dodecanoic, C12 | Butyric, C4 | 44.7 |
| 4 | tetradecanoic, C14 | Acetic, C2 | 52.8 |
| 5 | hexadecanoic, C16 | Acetic, C2 | 52.4 |
| 6 | Octadecanoic, C18 | Acetic, C2 | 35.2 |
| 7 | Octadecenoic, C18:1 | Acetic, C2 | 33.7 |
| 8 | Fatty acid mixture, C8 and C10 | Acetic, C2 | 38.3 |

An improved purity is obtained by using dodecanoic acid anhydride for the acylation reaction in step 1, and performing this reaction at 180° C. for 45 minutes. The removal of dodecanoic acid and excess dodecanoic acid anhydride is done by short path distillation at 180° C. The procedure reduces the formation of dodecanoic acid 2,3-diacetoxy-propyl ester in the following steps, and so the purification step 4 can be avoided.

A further improved purity is obtained by protection of the hydroxyl group of the hydroxy fatty acid of, for example, fully hydrogenated castor oil with dihydropyran, followed by an interesterification with a triglyceride of the desired short chain fatty acid, and subsequent removal of the excess short chain triglyceride and distillation, and finally distilling off the mono long chain fatty acid triglycerides. The protection group is then removed, and the hydroxy fatty acid is esterified with a long chain fatty acid anhydride to form the desired product in a purity of up to 85% (depending on the concentration of the hydroxy fatty acid in the fully hydrogenated castor oil). The purity can be further increased by removal of non-hydroxy fatty acid triglycerides such as Mono-di-Ac-C18. Part of the process is described in WO01/60172 example 1, however the hydroxyl group of the hydroxy fatty acid was not esterified with a long chain fatty acid, and the purity of the product was not improved by distillation.

Results

A number of properties of samples of PVC containing the four tested plasticisers at two different treatment rates (40 and 60 parts per hundred parts resin) were measured. The properties were Shore A Hardness, Tensile Strength, 100% Modulus and Elongation. The mechanical properties of the PVC samples, namely tensile strength, modulus, and elongation were measured in accordance with international standards DIN 53455, DIN 53457 and DIN 53504. Shore A hardness was measured in accordance with DIN 53505. The data are presented below

| Plasticiser | Concen-tration [phr] | Shore A (after 15 sec.) | Tensile strength [Mpa] | 100% Modulus [Mpa] | Elongation [%] |
|---|---|---|---|---|---|
| GRINDSTED SOFT-N-SAFE | 40 | 88.5 | 25.1 | 9.7 | 346 |
| Present Compound * | 40 | 96.0 | 25.0 | 12.8 | 340 |
| TOTM | 40 | 95.3 | 26.0 | 14.9 | 318 |
| Polyadipate | 40 | 96.3 | 26.0 | 16.3 | 300 |
| GRINDSTED SOFT-N-SAFE | 60 | 77.6 | 19.0 | 4.4 | 454 |
| Present Compound * | 60 | 84.0 | 19.0 | 7.8 | 347 |
| TOTM | 60 | 80.2 | 20.0 | 6.3 | 394 |
| Polyadipate | 60 | — | 20.8 | 5.0 | 421 |

* C12 - Journal 2225/120

At 40 parts plasticiser the compound of the present invention performs well and exhibits tends to have better plasticising properties than two of the commercial products.

Volatility was measured by TGA (Thermogravimetric analysis) in accordance with ASTM E1131. Volatility is an important parameter in the plastics industry as it provides a measure of the extent to which products will remain stable at elevated temperatures. Processing of the plasticiser when incorporated in to a plastic such as PVC will typically take place at temperatures above 150° C. TGA shows whether the plasticiser is stable at the intended operating temperature.

Some end use applications require low volatility. Wire and cable applications require that products survive stability testing at temperatures above 100° C. Tests are often run at 121° C. Only plasticisers with sufficiently low volatility (and suitable plasticising effects) will be acceptable in such applications.

Viscosity is an important parameter for a plasticiser. Low viscosity is generally accepted in the industry to indicate good plasticising properties. Lower viscosity plasticisers will result in a lower viscosity from the resultant plastics and this in turn will facilitate easier and better processing—for example in wall paper and vinyl flooring applications. Viscosity can be measured according to ASTM D445.

Example 9

Raw Materials and Solvents

Hydrogenated castor oil from Oleo Chemie
Acetic acid anhydride
Dodecanoyl chloride from Acros Organics
Decanoyl chloride
Pyridine
Methylene chloride
Demineralised water
Mg-sulphate
Lipozyme TL IM from Novozyme A/S Process 2:

Preparation of Acetylated Hydrogenated Castor Oil from a Mixture of Hydrogenated castor oil and acetic acid anhydride.

Equipment:

50 L stainless steel reactor with electrical heating, mechanical stirring, water vapour supply, distillation column, condenser, distillate collector and vacuum equipment.

Experiment:

24 kg hydrogenated castor oil flakes were added to the reactor together with 8.4 kg acetic acid anhydride and heated to 80° C. where the stirring was turned on. The reaction started at 120° C. and the temperature increased exothermically to 150° C.

Process 3:

Preparation of Acylated Hydrogenated Castor Oil from a Mixture of Hydrogenated Castor oil and dodecanoyl chloride in methylene chloride using pyridine as a catalyst.

Equipment:

5000 mL three necked reaction flask equipped with temperature control, reflux condenser, mechanical stirrer, pressure equalising dosing funnel, nitrogen supply and drying tube. 5000 mL separation funnel, filtration equipment and rotary evaporator.

Experiment:

275 gram of hydrogenated castor oil was dissolved in 2400 mL dry methylene chloride (kept dry over a molecular sieve) at 40° C. The solution was cooled to 30° C. and 62 gram of pyridine was added. 169 gram of dodecanoyl chloride was dissolved in 250 mL dry methylene chloride and added to the dosing funnel. The dodecanoyl chloride solution was added slowly to the reaction mixture during 3 hours keeping the temperature at 30° C.

To the reaction mixture was added 600 mL 30° C. warm demineralised water and the mixture was separated in the separation funnel. The organic phase was washed twice with additional 600 mL 30° C. warm demineralised water. The organic phase was kept at 30° C. and dried with Mg-sulphate.

The dry organic phased was filtered and concentrated in a rotary evaporator at 40° C. and 30 kPa for 30 min and 70° C. for 30 min.

Yield 439 gram of 1,2,3-tri-(12-dodecanoyloxy-octadecanoyloxy)-propane (Mw: 1486.39 gram/mol)

Process 4:

Drying of immobilised enzyme preparation of *Thermomyces lanuginosa* lipase Lipozyme TL IM (Novozyme A/S) with acetylated hydrogenated castor oil (1,2,3-tri-(12-acetylxy-octadecanoyloxy)-propane)

Equipment:

3000 mL three necked reaction flask with temperature control, mechanical stirrer and nitrogen cover.

Experiment:

1054 gram of acetylated hydrogenated castor oil was placed in the reactor with 147 gram of Lipozyme TL IM and heated to 60° C. for 24 hrs in order to hydrolyse the (12-acetyloxy-ocatadecanoic acid moieties from the glycerol backbone using the water which was added with the enzyme (water content of the enzyme was about 7%).

The reaction mixture was decanted from the enzyme, and the enzyme was used in Process 5 and 7.

Process 5:

Interesterification of triacetin with 1,2,3-tri-(12-dodecanoyloxy-octadecanoyloxy)-propane (product of process 3) using the dried enzyme of Process 4 as catalyst, removal of excess triacetin and recovery of the main product 12-dodecanoyloxy-ocatadecanoic acid 2,3-bis(acetoxy)-propyl ester (Mw: 640.93 gram/mol) and its positional isomer 12-dodecanoyloxy-octadecanoic acid 2-acetoxy-1-acetoxymethyl-ethyl ester (Mw. 640.93 gram/mol) (LODA)

Equipment:

3000 mL three necked reaction flask with temperature control, mechanical stirrer and nitrogen cover. 5000 mL distillation equipment with Claissen head, water vapour addition tube and vacuum equipment, Filtration equipment and molecular distillation equipment (KDL 5 from UIC Gmbh.)

Experiment:

Three reactions with 1000 gram of 1,2,3-tri-(12-dodecanoyloxy-octadecanoyloxy)-propane (product of process 3)

was placed in the reactor and mixed with the dried enzyme of Process 4 and 470 gram of triacetin was added. The reactor was heated to 60° C. and reacted for 24 hours. The enzyme was removed by filtration and the reaction mixture was placed in a 5000 mL distillation equipment and heated to 180° C. at reduced pressure of 0.2 kPa with addition of water vapour for 1.5 hours to remove excess triacetin from the reaction mixture. 2623 gram of a concentrated reaction mixture was treated in a molecular distillation equipment at 255° C., 0.7 Pa and a flow of 786 gram/hour. 1346 gram or 51.3% was recovered as distillate. The enzyme from reaction one and two was reused in the following reaction.

The distillate was analysed by gas chromatography (GC) and consist of 56 weight % of a mixture of 12-dodecanoyloxy-ocatadecanoic acid 2,3-bis(acetoxy)-propyl ester (Mw: 640.93 gram/mol) and its positional isomer 12-dodecanoyloxy-octadecanoic acid 2-acetyloxy-1-acetoxymethyl-ethyl ester (Mw. 640.93 gram/mol) in the ration 2:1.

Process 6:

Preparation of Acylated Hydrogenated Castor Oil from a Mixture of Hydrogenated Castor oil and decanoyl chloride in methylene chloride using pyridine as a catalyst.

Equipment:

5000 mL three necked reaction flask equipped with temperature control, reflux condenser, mechanical stirrer, pressure equalising dosing funnel, nitrogen supply and drying tube. 5000 mL separation funnel, filtration equipment and rotary evaporator.

Experiment:

275 gram of hydrogenated castor oil was dissolved in 2300 mL dry methylene chloride (kept dry over molecular sieve) at 40° C. The solution was cooled to 30° C. and 62 gram of pyridine was added. 148 gram of decanoyl chloride was dissolved in 250 mL dry methylene chloride and added to the dosing funnel. The decanoyl chloride solution was added slowly to the reaction mixture during 3 hours keeping the temperature at 38° C.

600 mL 30° C. warm demineralised water was added to the reaction mixture and the mixture was separated in the separation funnel. The organic phase was washed twice with additional 600 mL 30° C. warm demineralised water. The organic phase was kept at 30° C. and dried with Mg-sulphate.

The dry organic phased was filtered and concentrated in a rotary evaporator at 40° C. and 30 kPa for 30 min and 70° C. for 30 min.

The yield was 415 gram of 1,2,3-tri-(12-decanoyloxy-octadecanoyloxy)-propane (Mw: 1402.23 gram/mol).

Process 7:

Interesterification of triacetin with 1,2,3-tri-(12-decanoyloxy-octadecanoyloxy)-propane (product of Process 6) using the dried enzyme of Process 4 as catalyst, removal of excess triacetin and recover of the main product 12-decanoyloxy-ocatadecanoic acid 2,3-bis(acetoxy)-propyl ester (Mw: 612.88 gram/mol) and its positional isomer 12-decanoyloxy-octadecanoic acid 2-acetoxy-1-acetoxymethyl-ethyl ester (Mw. 612.88 gram/mol) (DODA).

Equipment:

3000 mL three necked reaction flask with temperature control, mechanical stirrer and nitrogen cover. 5000 mL Distillation equipment with Claissen head, water vapour addition tube and vacuum equipment, filtration equipment and molecular distillation equipment (KDL 5 from UIC Gmbh.).

Experiment:

Three reactions with 1000 gram of 1,2,3-tri-(12-decanoyloxy-octadecanoyloxy)-propane (product of Process 6) was placed in the reactor and mixed with the dried enzyme of Process 4 and 470 gram of triacetin was added. The reactor was heated to 60° C. and allowed to react for 24 hours. The enzyme was removed by filtration and the reaction mixture was placed in a 5000 mL distillation equipment and heated to 180° C. at reduced pressure of 0.2 kPa with water vapour addition for 1.5 hours to remove excess triacetin from the reaction mixture. 2623 gram of a concentrated reaction mixture was treated in a molecular distillation equipment at 255° C., 0.7 Pa and a flow of 786 gram/hour. 1346 gram or 51.3% was recovered as distillate. The enzyme from reaction one and two was reused in the following reaction.

The distillate was analysed by gas chromatography (GC) and consist of 71 weight % of a mixture of 12-decanoyloxy-ocatadecanoic acid 2,3-bis(acetyloxy)-propyl ester (Mw: 612.88 gram/mol) and its positional isomer 12-decanoyloxy-octadecanoic acid 2-acetyloxy-1-acetoxymethyl-ethyl ester (Mw. 612.88 gram/mol) in the ration 2:1.

Results

Test of the products of Process 5 and 7 against various commercial plasticisers in poly vinyl chloride (PVC).

PVC Dry-blends with various plasticisers are produced in a Brabender Mixer P600 according to DIN 54 802 and ISO/DIS 4574 at a temperature at 88° C. and a mixing speed at 100 rpm.

PVC material: PVC resin—suspension type Solvin S 271 PC Bag no.: 003445

| | | Parts | |
|---|---|---|---|
| PVC | PVC resin | 100 | |
| Dry blend: | Stabiliser | 10 | 6 parts ESO Lancroflex E2307*<br>4 parts Ba/Zn—, Lancromark LZB 693* |
| | Plasticisers | 40 | |

*available from Ackros Chemical Limited

The PVC dry-blends are compounded in a Brabender double screw extruder 42/7. The temperature profile at the extruder from the hopper is: 160° C.-175° C.-175° C.

The test specimens are cut from 3 mm thick plaques injection moulded in a BOY 25M injection moulding machine. The temperature profile at the extruder from the hopper is: 200° C.-210° C.-225°-220° C.

Plasticisers:

| | |
|---|---|
| DODA: | 12-Decanoyloxy-Octadecanoicacid-2,3-diacetoxy polyester (product of Example 9 - Process 7) |
| LODA: | 12-Dodacanoyloxy-Octadecanoicacid-2,3-diacetoxy propylester (product of Example 9 - Process 5) |
| S-N-S: | GRINDSTED SOFT-N-SAFE: Product number 175540 lot 4010155696, fully acetylated monoglyceride of hydrogenated castor oil |
| DOP: | Standard phathalate |
| TOTM | TriOctylTriMilitate from Sigma-Aldrich Chemie |

The new plasticisers DODA and LODA are tested in comparison with GRINDSTED SOFT-N-SAFE, DOP and TOTM

| Plasticiser type | Absorption Time [min] |
|---|---|
| S-N-S | 4:24 |
| DOP | 4:14 |
| DODA | 7:54 |

-continued

| Plasticiser type | Absorption Time [min] |
|---|---|
| LODA | 7:56 |
| TOTM | 7:58 |

The absorption time was measured in accordance with international standards DIN 54802.

The mechanical properties are measured on an INSTRON Tensil tester and the Shore-A values are measured on an INSTRON Durability measure and a Shore-A probe.

| Plasticiser type | Ultimate Elongation (%) | Tensile Strength (MPa) | Elongation after Relax (%) | Hardness after 15 s (Shore A) | 100% Modulus (MPa) |
|---|---|---|---|---|---|
| S-N-S | 723 | 24.3 | 96.6 | 84.2 | 7.4 |
| DOP | 648 | 22.2 | 86.5 | 83.3 | 7.3 |
| TOTM | 627 | 24.1 | 131.0 | 89.1 | 10.2 |
| DODA | 664 | 24.0 | 135.1 | 88.6 | 9.3 |
| LODA | 647 | 23.2 | 154.4 | 89.9 | 9.7 |

The above data are shown in FIG. 3.

All publications mentioned in the above specification are herein incorporated by reference. Various modifications and variations of the described methods and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in chemistry or related fields are intended to be within the scope of the following claims.

The invention claimed is:

1. A compound of the formula

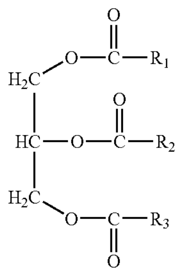

wherein $R_1$ is an alkyl, alkenyl or alkynyl group containing x carbon atoms, wherein x is from 1 to 10 wherein one of $R_2$ and $R_3$ is an alkyl, alkenyl or alkynyl group containing y carbon atoms, wherein y is from 1 to 10, wherein the other of $R_2$ and $R_3$ is a branched group of the formula

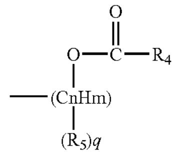

wherein q is from 0 to 3, wherein each $R_5$ is independently selected from —OH and —O—C(O)—$R_4$ wherein n is from 10 to 20 and m is selected from 2n-q, 2n-2-q, 2n-4-q, and 2n-6-q, wherein each $R_4$ is independently selected from alkyl, alkenyl and alkynyl groups containing z carbon atoms, wherein z is from 7 to 21, wherein z is different to at least one of x and y.

2. A compound according to claim 1 wherein z is different to x and y.

3. A compound according to claim 1 wherein x is equal to y.

4. A compound according to claim 1 wherein x is equal to y, and z is different to x and y.

5. A compound according to claim 1 wherein x is from 1 to 5.

6. A compound according to claim 1 wherein x is from 1 to 3.

7. A compound according to claim 1 wherein x is 1.

8. A compound according to claim 1 wherein y is from 1 to 5.

9. A compound according to claim 1 wherein y is from 1 to 3.

10. A compound according to claim 1 wherein y is 1.

11. A compound according to claim 10 wherein n is from 16 to 20.

12. A compound according to claim 10 wherein n is from 16 to 18.

13. A compound according to claim 10 wherein n is 17.

14. A compound according to claim 1 wherein z is from 8 to 17.

15. A compound according to claim 1 wherein z is from 8 to 15.

16. A compound according to claim 1 wherein z is from 9 to 13.

17. A compound according to claim 1 wherein z is 11.

18. A compound according to claim 1 wherein the branched group is a group of the formula

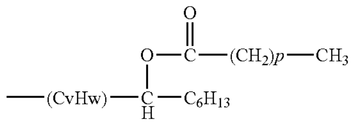

wherein v is from 7 to 10, w is 2v, and p is from 7 to 19.

19. A compound according to claim 18 wherein v is 10.

20. A compound according to claim 18 wherein p is from 7 to 14.

21. A compound according to claim 19 wherein p is 8 or 12.

22. A compound according to claim 19 wherein p is 10.

23. A compound according to claim 1 wherein $R_3$ is the branched group.

24. A compound according to claim 1 wherein x is 1, y is 1, n is 17 and z is 11.

25. A compound according to claim 1 of the formula

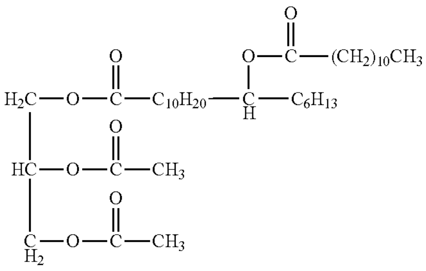

26. A composition comprising i) a thermoplastic polymer ii) a compound as defined in any one of the preceding claims.

27. A composition according to claim 26 wherein the thermoplastic polymer is or comprises a vinyl chloride polymer or a vinyl chloride copolymer selected from vinyl chloride/vinyl acetate copolymer, vinyl chloride/vinylidene chloride copolymer, vinyl chloride/ethylene copolymer and a copolymer prepared by grafting vinyl chloride onto ethylene/vinyl acetate copolymer, and mixtures thereof.

28. A composition according to claim 26 wherein the thermoplastic polymer is or comprises a polymer blend of a thermoplastic polymer and a second polymer.

29. A composition according to claim 28, wherein the second polymer is a methacryl polymer or an acrylonitrile-butadiene-styrene polymer.

30. A composition according to claim 26 wherein the composition comprises the compound in an amount of 1 to 100 parts by weight per 100 parts by weight of the thermoplastic polymer.

* * * * *